(12) United States Patent
Paffrath

(10) Patent No.: US 6,220,732 B1
(45) Date of Patent: Apr. 24, 2001

(54) SIDE MARKER LAMP MOUNTING ASSEMBLY

(75) Inventor: Edgar C. Paffrath, Milwaukee, WI (US)

(73) Assignee: Wesbar Corporation, West Bend, WI (US)

( * ) Notice: Subject to any disclaimer, the term of this patent is extended or adjusted under 35 U.S.C. 154(b) by 0 days.

(21) Appl. No.: 09/413,125

(22) Filed: Oct. 6, 1999

(51) Int. Cl.$^7$ ..................................... B60Q 1/26
(52) U.S. Cl. ........................ 362/496; 362/548; 362/549
(58) Field of Search .................... 362/496, 493, 362/495, 497, 501, 505, 506, 487, 477, 548, 549

(56) References Cited

U.S. PATENT DOCUMENTS

| D. 334,630 | 4/1993 | Paffrath | D26/120 |
|---|---|---|---|
| 3,656,105 | 4/1972 | Steltzer et al. | 340/119 |
| 3,941,994 | 3/1976 | Petty et al. | 240/8.1 |
| 4,163,275 | 7/1979 | Weber et al. | 362/80 |
| 5,150,959 | 9/1992 | Paffrath et al. | 362/80 |
| 6,056,452 * | 5/2000 | Appelberg | 362/493 |

* cited by examiner

Primary Examiner—Thomas M. Sember
(74) Attorney, Agent, or Firm—Andrus, Sceales, Starke & Sawall, LLP

(57) ABSTRACT

A side marker lamp mounting assembly for mounting a side marker lamp vertically to an angled, non-horizontal exterior surface of a vehicle and creating an electrical grounding connection between the lamp and the exterior of the vehicle. The support, formed of a non-conductive material, is wedge-shaped and includes a number of mounting sleeves disposed within its interior. A U-shaped ground clip is inserted and secured within a pair of the sleeves such that a central portion of the clip extends below the support to electrically contact the exterior surface of the vehicle. A screw threaded into one of the sleeves secures the support to the vehicle and engages a first end portion of the clip to ensure electrical connection of the clip with the vehicle. The lamp is mounted to the support by a second screw threaded into a second of the sleeves and the second screw contacts a central section of a ground conductor strip extending beneath the lamp. The ground strip is connected to a lighting mechanism within the lamp. The second screw also contacts a second end portion of the ground clip as it is threaded in the second sleeve and provides an electrical connection between the central section of the ground strip and the clip. In this manner, the lamp is mounted vertically to the exterior surface of the vehicle while forming an electrical grounding connection from the ground strip to the screw, from the screw to the ground clip, and from the ground clip to the vehicle.

13 Claims, 2 Drawing Sheets

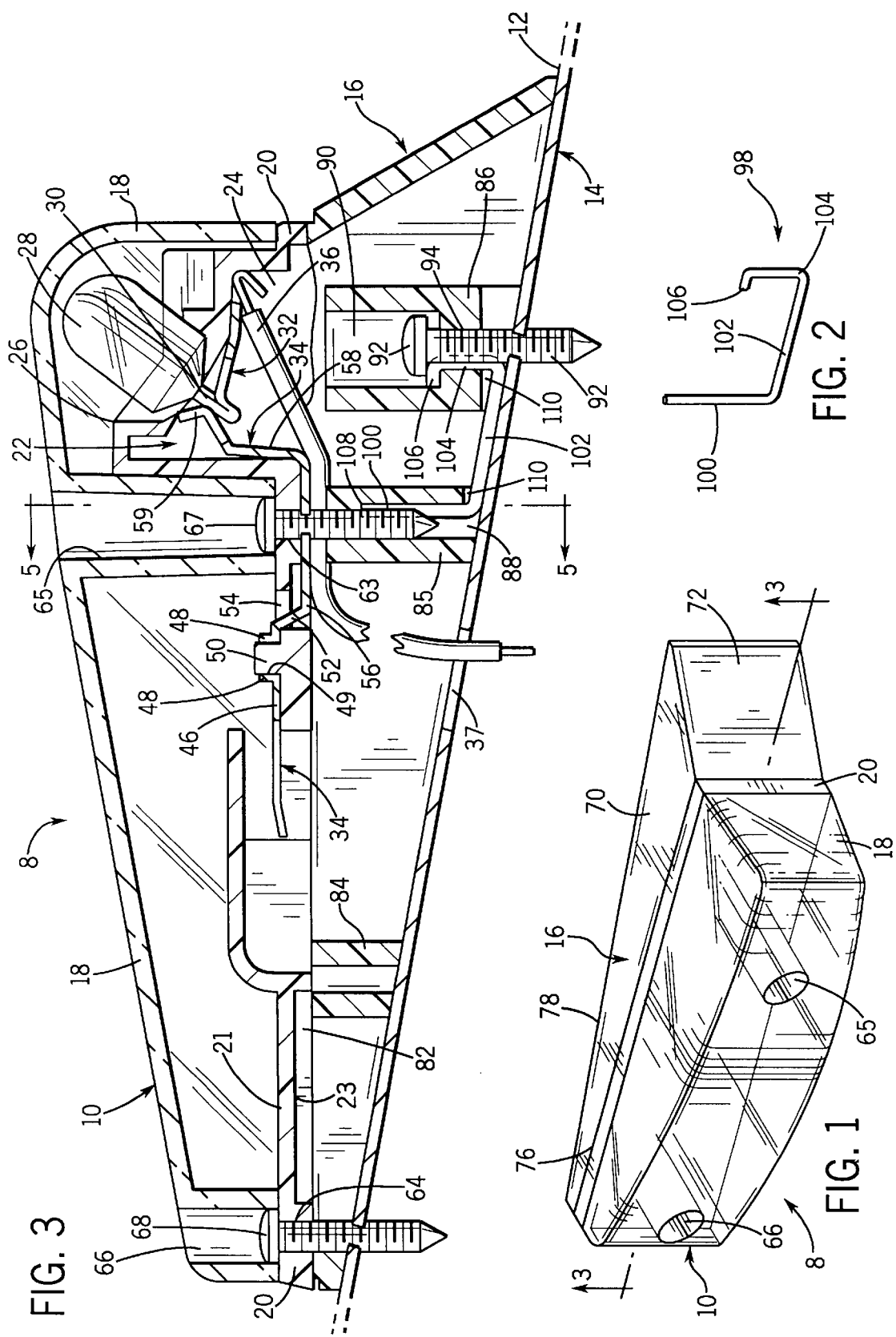

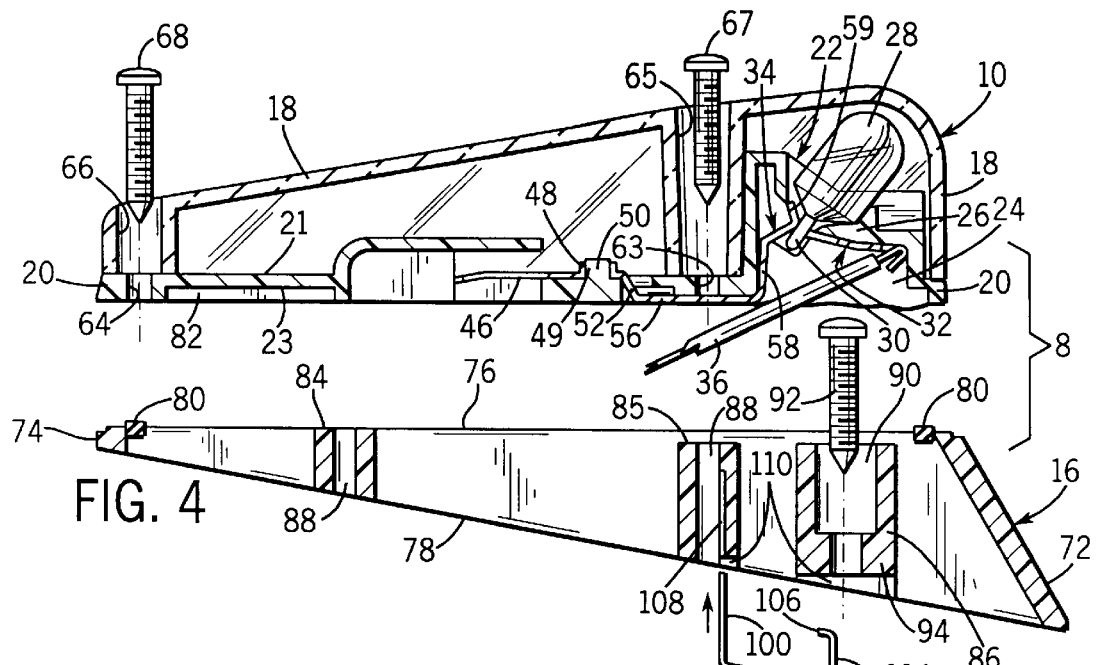
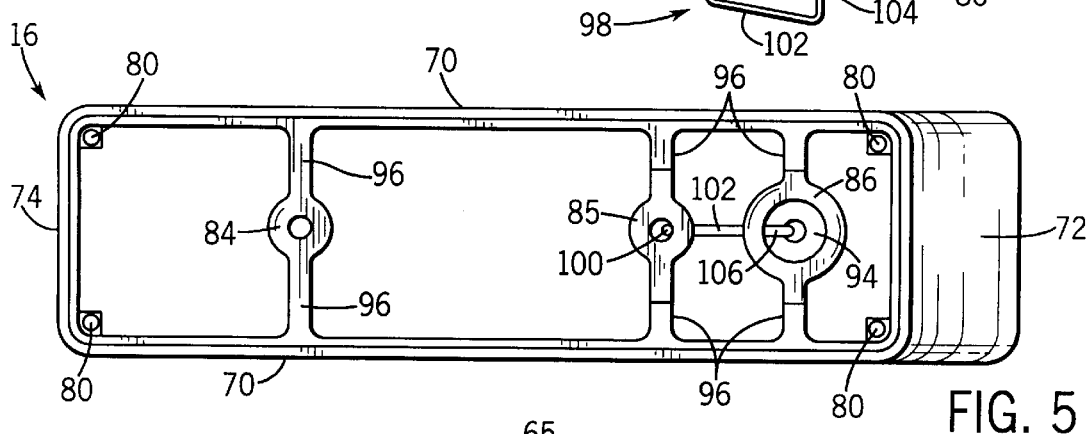
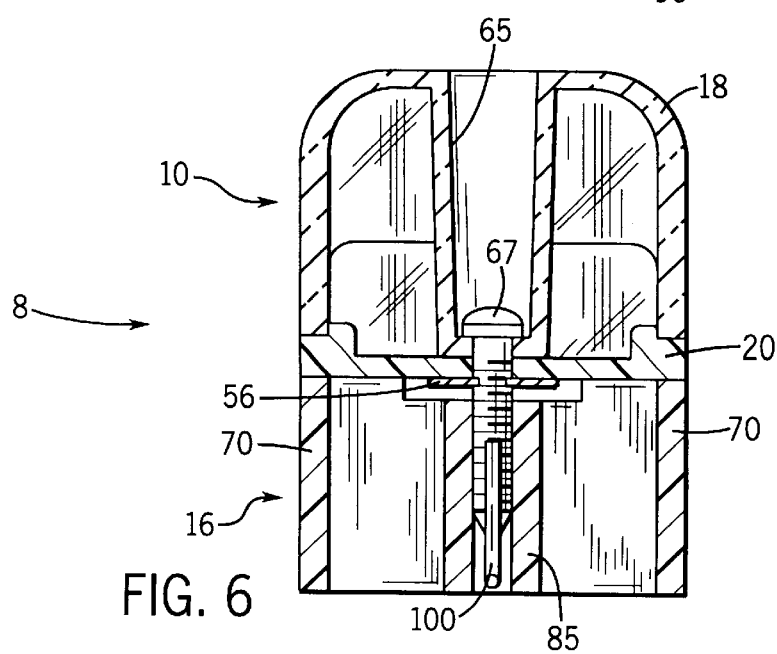

SIDE MARKER LAMP MOUNTING ASSEMBLY

BACKGROUND OF THE INVENTION

The present invention relates to an improved side marker clearance and reflex lamp assembly to be used with recreational vehicles, such as boat trailers. More specifically, the invention relates to a support used to ground a lead wire extending from the lamp to the recreational vehicle.

Replaceable side marker lamps have long been used on many different types of recreational vehicles. A lamp of this type is disclosed in U.S. Pat. No. 5,150,959. The lamps are of simple construction, comprising a plastic base, a lighting mechanism affixed to the base, and a translucent plastic lens hermetically sealed over the base and enclosing the lighting mechanism. The lighting mechanism includes a side marker bulb, received within a seat extending forwardly from the base. The mechanism also includes a bulb conductor strip and a ground conductor strip located in the seat that provide an electric socket for the bulb. The conductor strips extend beneath the seat into a recess located under the seat, and a lead wire is attached to the bulb conductor strip.

To supply electrical power to the lamp, the lead wire extends outwardly from the recess in the base of the lamp and is sealed in connection with the bulb conductor strip by a layer of a thermosetting resin filling the recess in the base. The lead wire is connected to the electrical system of the vehicle through a hole in the exterior of the vehicle.

The ground strip, as disclosed in the aforementioned patent, includes a central plate-like section that protrudes below the base of the lamp and extends parallel to the base, allowing the central section to contact the exterior surface of the recreational vehicle when the lamp is mounted to the vehicle. In this manner, the ground strip electrically contacts the recreational vehicle body and forms a ground for the lighting mechanism contained within the lamp.

In mounting the lamp to the vehicle, as described in the aforementioned patent, the lamp is secured to the exterior of the recreational vehicle body by a pair of screws inserted into and retained within a pair of cylindrical wells in the lamp. The wells extend through the lens and are aligned with openings in the base of the lamp. The screws are inserted into the wells and protrude through the openings in the base of the lamp to engage the exterior surface of the recreational vehicle body. One of the wells is located directly over the central section of the ground conductor strip. Thus, when the screw inserted into that well is engaged with the exterior surface of the recreational vehicle body, the screw pierces the central section and presses it into contact with the vehicle body to form the ground for the lamp.

With certain types of vehicles, in order to vertically position the lamp on the vehicle, it is necessary to place a support for the lamp between the lamp and the vehicle body. In most situations where a support is necessary, the support is wedge-shaped to accommodate an angled, non-horizontal surface on the vehicle body to which the lamp is mounted. The wedge-shaped support vertically positions the lamp, allowing the lamp to face in a horizontal direction, and allowing for proper viewing of signals generated by or reflecting from the lamp.

However, when utilizing a support, the support necessarily separates the central section of the ground conductor strip from the vehicle body, preventing the central section from coming into direct electrical contact with the vehicle. Therefore, the ground conductor strip in the lighting mechanism of the lamp must be connected to the vehicle in some other manner.

To solve this problem, some prior art lamp supports are formed entirely of an electrically conductive material, such as die cast aluminum. Thus, an electrical ground is formed through the contact of the central section with the aluminum support, and the support with the vehicle body. These die cast supports, in order to be aesthetically pleasing while in use, are painted to match the color of the base of the lamp. Also, the supports are attached to the vehicle by welding them directly onto the exterior surface of the recreational vehicle body.

Overall, these prior art supports provide an effective means for creating a ground between the lamp and the vehicle when the lamp is necessarily spaced a distance from the vehicle body. However, as the support is welded to the vehicle body, the body of the recreational vehicle is marred due to the manner in which the support is attached to the vehicle. Furthermore, should the lamp support ever need to be replaced, due to damage to the support, or for other reasons, the support would need to be removed from the vehicle body, further marring the exterior surface of the vehicle body. This damage must be repaired or covered over in order to preserve the aesthetically pleasing appearance of the recreational vehicle.

The method in which these supports are made also illustrates other shortcomings of supports of this type. First, the supports are die cast, making each support relatively expensive and difficult to manufacture. Also, as the supports are painted to match the lamp base, any paint coming between the ground plate and the support can interfere with the electrical grounding connection between the lamp and the support, and possibly, the support and the vehicle.

SUMMARY OF THE INVENTION

The present invention discloses a mounting assembly for use in conjunction with a side marker lamp attached to the exterior surface of a recreational vehicle. The lamp used in conjunction with the present invention is of the type disclosed in U.S. Pat. No. 5,150,959 and consists of base and a lighting mechanism is attached to the outer surface of the base and includes a side marker bulb. A ground conductor strip and a bulb conductor strip are mounted on the base and form a socket for the bulb. A translucent lens is hermetically sealed over the base and encloses the lighting mechanism. The lens includes a number of cylindrical wells aligned with a set of openings in the base that receive screws for mounting the lamp to a vehicle.

A lead wire connected to the bulb conductor strip extends through a recess in the base, and is connected to the electrical system of the recreational vehicle through a hole in the exterior of the vehicle. The ground conductor strip includes a central flat section that extends below the bottom surface of the base.

The lamp is connected and grounded to a non-horizontal exterior surface of the vehicle through the use of a mounting support, preferably formed of a non-conductive material, and constructed according to the present invention. The support is generally wedge-shaped and includes a number of cylindrical mounting sleeves for mounting both the lamp to the support, and the support to the vehicle.

To assist in grounding the lamp to the vehicle, a ground clip is connected to the mounting support and extends between an adjacent pair of the mounting sleeves. The clip is generally U-shaped and the ends of the clip extend into each of the adjacent mounting sleeves while a central portion of the ground clip contacts the exterior surface of the vehicle. A mounting screw is inserted into one of the adjacent sleeves to secure the support to the exterior surface of the vehicle. The threads on the screw also engage an end portion of the U-shaped ground clip positioned in the mounting sleeve, thus electrically connecting the ground clip with the vehicle.

Once the support is mounted and grounded to the vehicle, the lamp is then mounted to the support. In mounting the lamp, the lead wire is inserted through the hole in the vehicle and mounting screws are inserted through the cylindrical wells in the lamp. As the central section of the ground conductor strip extending below the bottom of the lamp runs directly beneath one of the wells, the mounting screw inserted into that well pierces the central section, engaging the central section with the screw and creating an electrical connection between the screw and the central section. The mounting screw then enters a lamp mounting sleeve in the support which contains a second end of the U-shaped ground clip. Thus, when the screw is threaded within the lamp mounting sleeve, the screw engages the second end of the ground clip. As the screw is already in contact with the central section of the ground conductor strip, the screw forms an electrical contact between the central section and the second end of the ground clip. In this manner, an electrical grounding connection is made from the central section of the ground strip to the screw, from the screw to the U-shaped ground clip, and from the ground clip directly to the vehicle body.

The present invention provides a mounting assembly for a side marker lamp utilized with numerous types of vehicles, including recreational vehicles, that provides a reliable electric grounding connection between the lamp and the vehicle. The assembly also enables the lamp to be positioned vertically on an angled, non-horizontal surface of the vehicle, allowing signals from the lamp to be easily viewed by other drivers.

The mounting assembly is also inexpensive, of simple construction and easy to incorporate with a side marker lamp on a recreational vehicle. This is because the mounting support is secured to the vehicle by screws and does not significantly damage the exterior of the vehicle when the mounting support is secured to or removed from the vehicle.

BRIEF DESCRIPTION OF THE SEVERAL VIEWS OF THE DRAWING

In the drawings:

FIG. 1 is an isometric view of a side marker lamp mounting assembly of the present invention as attached to the surface of a vehicle;

FIG. 2 is a side view of a grounding clip utilized with the assembly of the present invention;

FIG. 3 is a cross-sectional view along line 3—3 of FIG. 3;

FIG. 4 is an exploded view of the cross-sectional view of FIG. 3;

FIG. 5 is a cross-sectional view along line 5—5 of FIG. 3; and

FIG. 6 is a top view of the grounded support of the assembly of FIG. 3.

DETAILED DESCRIPTION OF THE INVENTION

FIGS. 1–6 illustrate a side marker lamp mounting assembly 8 including a replaceable side marker lamp 10 mounted through a grounded support 16 to an exterior surface 12 of a vehicle 14, such as a boat trailer or recreational vehicle.

The structure of lamp 10 can be similar to that disclosed in Paffrath et al. U.S. Pat. No. 5,150,959 which is herein incorporated by reference. As seen in FIGS. 1 and 3–4, the lamp 10 includes a lens 18 hermetically sealed to a base 20 and enclosing a lighting mechanism 22.

The lens 18 is formed of a hard, translucent plastic material, while base 20 can be formed of a hard, opaque plastic material. The base 20 has a front surface 21 and a rear surface 23, and includes a recess 24 extending forwardly from the base 20 and defining a seat 26 for insertion of a side marker bulb 28. The bulb 28 is a standard, wedge-base type bulb in which the bulb contacts are located on the outer surface of a base portion 30 of the bulb 28. The base portion 30 extends through an opening in the seat 26 where the bulb 28 is electrically connected to a bulb conductor strip 32 and a ground conductor strip 34 that, along with bulb 28, form lighting mechanism 22. The bulb conductor strip 32 serves to electrically connect the bulb 28 through a lead wire 36 to a suitable power source through a hole 37 in the exterior surface 12 of the vehicle 14, while the ground conductor strip 34 connects the bulb 28 to a ground.

As shown in the above-referenced patent, the bulb conductor strip 32 includes a generally flat body and a flange that extends outwardly from the flat body at an angle thereto. The flange is provided with an open-ended slot that receives the base portion 30 of the bulb 28. The lead wire 36 is connected to the bulb conductor strip 32 by inserting the wire 36 through a hole in flat body and bending the end of the wire 36 to retain the wire 36 within the hole. The wire 36 is retained in connection with the bulb conductor strip 32 by a layer of thermosetting resin placed into the recess 24 that has been omitted for clarity purposes.

Referring now to FIGS. 3–4, the ground conductor strip 34 includes a flat section 46 that is mounted level with the front surface 21 of base 20. The flat section 46 includes a pair of flexible spaced tabs 48 bordering an opening 49 in flat section 46, the tabs 48 engaging a post 50 extending forwardly from the front surface 21 of base 20 to retain the flat section 46 on the front surface 21. A diagonal section 52 extends downwardly from the flat section 46 through an opening 54 in the base 20. The diagonal section 52 merges into a central section 56 that extends parallel to flat section 46 along the rear surface 23 of base 20. The end of central section 56 opposite diagonal section 52 is connected to a section 58 which terminates in a pair of spaced flexible tabs 59. The tabs 59 are contained in the seat 26 and border an open-ended slot (not shown) adapted to receive the base portion 30 of the bulb 28.

The base 20 also includes a pair of mounting bores 63 and 64 that are aligned with a pair of cylindrical wells 65 and 66 in the lens 18. A pair of screws 67 and 68 are received in wells 65 and 66 and inserted through bores 63 and 64 to secure the lamp 10 to the support 16 and to the vehicle 14, as best shown in FIG. 3. The central section 56 of ground conductor strip 34 is positioned adjacent the rear surface 23 of base 20 and encloses the lower end of bore 63. The insertion of screw 67 into well 65 and through bore 63 enables the screw 67 to pierce the central section 56 of ground strip 34 and electrically engage central section 56 with the screw 67.

Referring now to FIGS. 4 and 5, the support 16 upon which the lamp 10 is mounted is formed of a hard plastic and is generally wedge-shaped, having a pair of side walls 70 that taper from a wide end 72 to a narrow end 74, and has a generally open interior. The support 16 has an outer surface 76 to which the lamp 10 is attached, and an inner surface 78 that is positioned against the exterior surface 12 of the vehicle 14. Located in each corner of the outer surface 76 of support 16 is a positioning peg 80. Each peg 80 is engageable with a positioning ridge 82 extending rearwardly around the periphery of the rear surface 23 of base 20 to properly locate the lamp 10 on the outer surface 76 of support 16.

The open interior of the support 16 also includes a pair of lamp mounting sleeves 84 and 85 and a support mounting sleeve 86. The lamp sleeve 85 includes a cylindrical opening 88 that extends through the sleeve and receives the screws 67 that is used to secure the lamp 10 to the support 16. The opening 88 may be tapered from a narrow, upper end to a wide, lower end to increase the amount of frictional contact between the sleeve 85 and the screws 67. The support sleeve 86 also includes a cylindrical opening 90 that extends through the sleeve 86. Similar to the opening 88 in sleeve 85, opening 90 receives a screw 92 used to secure the support 16 to the vehicle 14. However, unlike the opening 88 in sleeve 85, this opening 90 includes a collar 94 located at the lower end of the opening 90.

The lamp sleeves 84 and 85, and support sleeve 86 are stabilized by pairs of ribs 96, shown in FIGS. 5–6. Their ribs 96 extend from opposite edges of lamp sleeves 84 and 85 and support sleeve 86 and serve to connect the respective sleeves to the side walls 70 of the support 16. The outer edges of sleeve 85 and ribs 96 connected to sleeve 85 adjacent the outer surface 76 are recessed to allow the lead wire 36 to extend over the ribs 96 and sleeve 85, as shown in FIG. 3. This allows the lead wire 36 to reach the center of the support 16, which is positioned over the hole 37. The lead wire 36 may then be inserted through the hole 37 and connected to the electrical system of vehicle 14 to operate the lamp 10.

In order to electrically ground the lamp 10 to the vehicle 14 when the lamp 10 is mounted on the support 16, a grounding clip 98 formed of a conductive metal is utilized with the support 16. As shown in FIG. 2, the clip 98 is generally U-shaped, including a first end portion 100, a central portion 102, and a second end portion 104. A locking stub 106 extends inwardly from second end portion 104 toward first end portion 100, as seen in FIG. 2.

Looking now at FIGS. 3–6, the clip 98 is attached to the support 16 between the lamp sleeve 85 and the support sleeve 86. The clip 98 is attached to the sleeves by inserting the end portion 104 and stub 106 into the support sleeve 86. At the same time, end portion 100 is inserted into a clip channel 108 located in the opening 88 of lamp sleeve 85, as shown in FIG. 4. Clip 98 is pressed into sleeves 85 and 86 until stub 106 engages the upper end of the collar 94 in sleeve 86 and the central portion 102 of clip 98 engages a pair of aligned grooves 110 located in the inner ends of lamp sleeve 85 and support sleeve 86. The grooves 110 allow the bottom edge of central portion 102 to project just below the inner surface 78 of the support 16 so that the clip 98 can electrically contact the exterior surface 12 of the vehicle 14. This arrangement of clip 98 and support 16 allows the clip 98 to be easily and securely attached to the support 16 while also preventing the rotation of the clip 98 with respect to the support 16.

To attach a lamp 10 to the exterior surface 12 of vehicle 14 utilizing support 16, first the hole 37 is drilled in the exterior surface 12 of the vehicle 14 to allow connection of the lead wire 36 to the electrical system of the vehicle 14. Next, the grounding clip 98 is then secured to the support 16 by insertion of the end portions 100 and 104 of the clip 98 into the lamp sleeve 85 and support sleeve 86 in the manner described above. Then, the inner surface 78 of support 16 is positioned on the exterior surface 12 of the vehicle 14 over the hole 37 such that the hole 37 remains uncovered and the central portion 102 of the clip 98 electrically contacts the exterior surface 12. Screw 92 is then inserted into the support sleeve 86 and engaged with the exterior surface 12 of the vehicle 14 to secure the support 16 to the vehicle 14. In doing so, the screw 92 electrically contacts the locking stub 106 and end portion 104 of the locking clip 98, further electrically contacting the clip 98 with the exterior surface 12 of vehicle 14.

After the support 16 is mounted to the vehicle 14, the lamp 10 may then be mounted to the support 16. The lead wire 36 is positioned over the ribs 96 attached to sleeve 84 and threaded through hole 37 for connection to the electrical system of the vehicle 14. Next, the lamp 10 is positioned on the outer surface 76 of support 16 by the interaction of the pegs 80 on the support 16 with the ridge 82 on the lamp 10. The pair of screws 67 and 68 are then inserted into the cylindrical wells 65 and 66 of lamp 10. The screws 67 and 68 extend through the mounting bores 63 and 64 in the base 20. The screw 67 passes through the central section 56 of ground conductor strip 34 disposed across the bore 63 and into the lamp sleeve 85. In lamp sleeve 85, the screw 67 contacts the end portion 100 of the grounding clip 98, electrically contacting the central section 56 with the clip 98 via the screw 67. The remaining screw 68 directly contacts the exterior surface of the vehicle 14 to secure the lamp 10 and support 16 to the vehicle 14.

I claim:

1. A side marker lamp mounting assembly affixed to an exterior surface of a vehicle comprising:

a lamp having a base and a lighting mechanism affixed to the base, the lighting mechanism including a conductor strip, a ground strip, and a side marker bulb electrically engaged with the conductor strip and ground strip, the lamp also including a translucent lens secured to the base enclosing the lighting mechanism;

a electrically non-conductive support having a first surface secured to the exterior surface of a vehicle and a second surface upon which the lamp is mounted; and an electrically conductive ground clip secured to the support and having a first portion in electrical contact with the ground strip and a second portion disposed along the first surface and engaging the vehicle.

2. The assembly of claim 1, wherein said support is provided with a first internal sleeve, said ground strip having a section extending across an end of the first sleeve, said first portion of the ground clip being disposed in said first sleeve, a fastener received in the first sleeve and disposed in electrical contact with said section of the ground strip and with said first portion of the clip.

3. A side marker lamp mounting assembly affixed to an exterior surface of a vehicle comprising:

a lamp having a base and a lighting mechanism affixed to the base, the lighting mechanism including a conductor strip, a ground strip, and a side marker bulb electrically engaged with the conductor strip and ground strip, the lamp also including a translucent lens secured to the base enclosing the lighting mechanism;

a electrically non-conductive support having a first surface secured to the exterior surface of a vehicle and a second surface upon which the lamp is mounted, said support including a first internal sleeve, said ground strip having a section extending across an end of the first sleeve;

an electrically conductive ground clip secured to the support and having a first portion in electrical contact with the ground strip and a second portion disposed along the first surface and engageing the first vehicle, said first portion of the ground clip being disposed in said first sleeve; and a fastener received in the first sleeve and disposed in electrical contact with said section of the ground strip and with said first portion of the clip, wherein said support includes a second internal sleeve, said clip having a third portion disposed in said second sleeve, and a second fastener received in said second sleeve and disposed in electrical contact with the third portion of said clip.

4. The assembly of claim 3, wherein said clip is generally U-shaped and said first and third portions are disposed in generally parallel relation.

5. The assembly of claim 4, wherein said third portion of the clip terminates in a stub extending laterally from said third portion, said assembly also including an abutment on the interior of said second sleeve and disposed to be engaged by said stub.

6. A side marker lamp mounting assembly affixed to an exterior surface of a vehicle comprising:

a lamp having a base and a lighting mechanism affixed to the base, the lighting mechanism including a conductor strip, a ground strip, and a side marker bulb electrically engaged with the conductor strip and ground strip, the lamp also including a translucent lens secured to the base enclosing the lighting mechanism;

a electrically non-conductive support having a first surface secured to the exterior surface of a vehicle and a second surface upon which the lamp is mounted, said support including a first internal sleeve, said ground strip having a section extending across an end of the first sleeve;

an electrically conductive ground clip secured to the support and having a first portion in electrical contact with the ground strip and a second portion disposed along the first surface and engaging the vehicle, said first portion of the ground clip being disposed in said first sleeve; and a fastener received in the first sleeve and disposed in electrical contact with said section of the ground strip and with said first portion of the clip, wherein said first sleeve is provided with an internal axial groove, the first portion of said clip being received in said groove.

7. A side marker lamp mounting assembly affixed to an exterior surface of a vehicle comprising:

a lamp having a base and a lighting mechanism affixed to the base, the lighting mechanism including a conductor strip, a ground strip, and a side marker bulb electrically engaged with the conductor strip and ground strip, the lamp also including a translucent lens secured to the base enclosing the lighting mechanism;

a electrically non-conductive support having a first surface secured to the exterior surface of a vehicle and a second surface upon which the lamp is mounted;

said support having a first internal sleeve, said ground strip having a section extending across an outer end of said first sleeve, an electrically conductive ground clip having a first end portion disposed in said first sleeve and having a second portion disposed at an angle to said first portion and located along the first surface of the support in position to contact the vehicle, and a fastener extending through said section of the ground strip and disposed in said first sleeve in contact with the first portion of the ground clip to thereby effect a ground connection between the ground strip and the vehicle.

8. The assembly of claim 7, and including means for preventing movement of the second portion of the clip relative to said support.

9. The assembly of claim 7, wherein said first sleeve has an axial internal groove and the first portion of said clip is received in said groove.

10. A side marker lamp mounting assembly affixed to an exterior surface of a vehicle comprising:

a lamp having a base and a lighting mechanism affixed to the base, the lighting mechanism including a conductor strip, a ground strip, and a side marker bulb electrically engaged with the conductor strip and ground strip, the lamp also including a translucent lens secured to the base enclosing the lighting mechanism;

a electrically non-conductive support having a first surface secured to the exterior surface of a vehicle and a second surface upon which the lamp is mounted;

said support having a first internal sleeve, said ground strip having a section extending across an outer end of said first sleeve, an electrically conductive ground clip having a first end portion disposed in said first sleeve and having a second portion disposed at an angle to said first portion and located along the inner surface of the support in position to contact the vehicle; and a fastener extending through said section of the ground strip and disposed in said first sleeve in contact with the first portion of the ground clip to thereby effect a ground connection between the ground strip and the vehicle, wherein said support has a second internal sleeve, said clip having a third portion disposed at an angle to said second portion and secured within said second sleeve.

11. The assembly of claim 9, wherein the axes of the first and second sleeves are in generally parallel relation and said clip is generally U-shaped with said first and third portions of said clip being in generally parallel relation.

12. The assembly of claim 9, wherein the third portion of said clip terminates in an end disposed generally normal to said third portion, said second sleeve having an internal shoulder engaged by the end of said third portion.

13. In combination:

a vehicle having an exterior surface; and a side marker lamp mounting assembly affixed to the exterior surface of the vehicle, the mounting assembly comprising:

a lamp having a base and a lighting mechanism affixed to the base, the lighting mechanism including a conductor strip, a ground strip, and a side marker bulb electrically engaged with the conductor strip and ground strip, the lamp also including a translucent lens secured to the base enclosing the lighting mechanism;

a electrically non-conductive support having a first surface secured to the exterior surface of the vehicle and a second surface upon which the lamp is mounted;

said support having a pair of internal sleeves with the axes of the sleeves being in generally parallel relation, said ground strip having a section extending across an outer end of said first sleeve, a generally U-shaped electrically conductive ground clip having a first end portion disposed in a first of said sleeves and having a second portion disposed generally normal to said first portion and located along the inner surface of the support in contact with the exterior surface of the vehicle, said clip also having a third portion connected to said second portion and extending in generally parallel relation with said first portion, said third portion being disposed in a second of said sleeves, a first fastener extending through said section of the ground strip and disposed in said first sleeve in contact with the first portion of the ground strip, and a second fastener disposed in said second sleeve in contact with the third portion of the ground clip.

* * * * *